(12) United States Patent
Richardson et al.

(10) Patent No.: US 9,986,802 B2
(45) Date of Patent: Jun. 5, 2018

(54) PROTECTIVE CUSHION COVER FOR AN ELECTRONIC DEVICE

(71) Applicant: OTTER PRODUCTS, LLC, Fort Collins, CO (US)

(72) Inventors: Curtis R. Richardson, Fort Collins, CO (US); Jamie L. Johnson, Fort Collins, CO (US); Alan V. Morine, Fort Collins, CO (US); Stephen Willes, Fort Collins, CO (US); Matthew M. Glanzer, Fort Collins, CO (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 816 days.

(21) Appl. No.: 14/092,120

(22) Filed: Nov. 27, 2013

(65) Prior Publication Data

US 2014/0076746 A1    Mar. 20, 2014

Related U.S. Application Data

(63) Continuation of application No. 12/648,549, filed on Dec. 29, 2009, now Pat. No. 8,623,494.
(Continued)

(51) Int. Cl.
*A45C 11/00* (2006.01)
*B29D 24/00* (2006.01)
(Continued)

(52) U.S. Cl.
CPC ............ *A45C 11/00* (2013.01); *B29D 24/001* (2013.01); *H04B 1/3888* (2013.01); *A45C 2011/003* (2013.01); *B29L 2031/7138* (2013.01); *G06F 2200/1633* (2013.01); *Y10T 428/2457* (2015.01); *Y10T 428/24479* (2015.01);
(Continued)

(58) Field of Classification Search
CPC . A45C 11/00; A45C 2011/003; B29D 24/001; B29L 2031/7138; G06F 2200/1633; H04B 1/3888; Y10T 428/24521; Y10T 428/24529; Y10T 428/2457;
(Continued)

(56) References Cited

U.S. PATENT DOCUMENTS 2,164,221 A    6/1939  Raney et al.
2,392,787 A    1/1946  Vermot
(Continued)

FOREIGN PATENT DOCUMENTS

JP    H0818637 A      1/1996
WO    1994000037 A1   1/1994
(Continued)

*Primary Examiner* — Brian Handville (57) ABSTRACT

Disclosed is a protective cover for an electronic device that is made from an elastomeric material that simultaneously provides cushioning that would otherwise be provided by a softer, thicker material, while utilizing a single, denser material that provides a slim profile and has sufficient density to conform well to the electronic device and prevent the transmission of impacts with hard surfaces directly to the electronic device. Although a denser material is used for the protective cover, recesses are formed in thicker portions at impact points that create compressible ribs. The ribs provide softer, cushioned portions of the cover in the impact areas, which are capable of absorbing the shock and energy of impacts.

32 Claims, 7 Drawing Sheets

Related U.S. Application Data (60) Provisional application No. 61/141,097, filed on Dec. 29, 2008.

(51) Int. Cl.
*H04B 1/3888* (2015.01)
*B29L 31/00* (2006.01)

(52) U.S. Cl.
CPC ............... Y10T 428/24512 (2015.01); Y10T 428/24521 (2015.01); Y10T 428/24529 (2015.01); Y10T 428/24537 (2015.01); Y10T 428/24983 (2015.01)

(58) Field of Classification Search
CPC ..... Y10T 428/24479; Y10T 428/24983; Y10T 428/24512; Y10T 428/24537
USPC .......................................................... 206/37
See application file for complete search history.

(56) References Cited

U.S. PATENT DOCUMENTS

| | | |
|---|---|---|
| 3,023,885 A | 3/1962 | Kindseth |
| 3,184,847 A | 5/1965 | Leo |
| 3,482,895 A | 12/1969 | Becklin |
| 3,521,216 A | 7/1970 | Tolegian |
| 3,590,988 A | 7/1971 | Hollar |
| 3,665,991 A | 5/1972 | Gillemot et al. |
| 3,689,866 A | 9/1972 | William |
| 3,832,725 A | 8/1974 | Cook |
| 4,097,878 A | 6/1978 | Cramer |
| 4,298,204 A | 11/1981 | Jinkins |
| 4,312,580 A | 1/1982 | Schwomma et al. |
| 4,335,930 A | 6/1982 | Feldman |
| 4,352,968 A | 10/1982 | Pounds |
| 4,375,323 A | 3/1983 | Inagaki et al. |
| 4,383,743 A | 5/1983 | Nozawa et al. |
| 4,418,830 A | 12/1983 | Dzung et al. |
| 4,420,078 A | 12/1983 | Belt et al. |
| 4,584,718 A | 4/1986 | Fuller |
| 4,658,956 A | 4/1987 | Takeda et al. |
| 4,683,587 A | 7/1987 | Silverman |
| 4,686,332 A | 8/1987 | Greanias et al. |
| 4,703,161 A | 10/1987 | Mclean |
| 4,733,776 A | 3/1988 | Ward |
| 4,762,227 A | 8/1988 | Patterson |
| 4,803,504 A | 2/1989 | Maeno et al. |
| 4,942,514 A | 7/1990 | Miyagaki et al. |
| 4,963,902 A | 10/1990 | Fukahori |
| 4,977,483 A | 12/1990 | Perretta |
| 4,994,829 A | 2/1991 | Tsukamoto |
| 5,002,184 A | 3/1991 | Lloyd |
| 5,025,921 A | 6/1991 | Gasparaitis et al. |
| 5,087,934 A | 2/1992 | Johnson |
| 5,092,458 A | 3/1992 | Yokoyama |
| 5,092,459 A | 3/1992 | Uljanic et al. |
| 5,175,873 A | 12/1992 | Goldenberg et al. |
| 5,177,515 A | 1/1993 | Tsukamoto |
| 5,219,067 A | 6/1993 | Lima et al. |
| 5,231,381 A | 7/1993 | Duwaer |
| 5,233,502 A | 8/1993 | Beatty et al. |
| 5,239,323 A | 8/1993 | Johnson |
| 5,239,324 A | 8/1993 | Ohmura et al. |
| 5,285,894 A | 2/1994 | Kamata et al. |
| 5,294,988 A | 3/1994 | Wakabayashi et al. |
| 5,305,032 A | 4/1994 | Arai |
| 5,336,896 A | 8/1994 | Katz |
| 5,360,108 A | 11/1994 | Alagia |
| 5,380,968 A | 1/1995 | Morse |
| 5,386,084 A | 1/1995 | Risko |
| 5,388,691 A | 2/1995 | White |
| 5,499,713 A | 3/1996 | Huffer |
| 5,505,328 A | 4/1996 | Stribiak |
| 5,573,164 A | 11/1996 | Law |
| 5,583,742 A | 12/1996 | Noda et al. |
| 5,584,054 A | 12/1996 | Tyneski et al. |
| 5,586,002 A | 12/1996 | Notarianni |
| 5,586,176 A | 12/1996 | Peck |
| 5,590,760 A | 1/1997 | Astarb |
| 5,610,655 A | 3/1997 | Wakabayashi et al. |
| 5,613,237 A | 3/1997 | Bent et al. |
| 5,632,373 A | 5/1997 | Kumar et al. |
| 5,636,101 A | 6/1997 | Bonsail et al. |
| 5,648,757 A | 7/1997 | Vernace et al. |
| 5,681,122 A | 10/1997 | Burke |
| 5,707,757 A | 1/1998 | Lee |
| 5,713,048 A | 1/1998 | Hayakawa |
| 5,713,466 A | 2/1998 | Tajima |
| 5,845,803 A | 12/1998 | Saito et al. |
| 5,850,915 A | 12/1998 | Tajima |
| 5,889,730 A | 3/1999 | May |
| 5,907,721 A | 5/1999 | Schelling et al. |
| 5,946,501 A | 8/1999 | Hayakawa |
| 5,956,291 A | 9/1999 | Nehemiah et al. |
| 5,982,520 A | 11/1999 | Weiser et al. |
| 5,990,874 A | 11/1999 | Tsumura et al. |
| 6,031,524 A | 2/2000 | Kunert |
| 6,041,924 A | 3/2000 | Tajima |
| 6,049,813 A | 4/2000 | Danielson et al. |
| 6,068,119 A | 5/2000 | Derr et al. |
| 6,073,770 A | 6/2000 | Park |
| 6,082,535 A | 7/2000 | Mitchell |
| 6,092,707 A | 7/2000 | Bowes |
| 6,094,785 A | 8/2000 | Montgomery et al. |
| 6,128,441 A | 10/2000 | Kamata et al. |
| 6,132,367 A | 10/2000 | Adair |
| 6,201,867 B1 | 3/2001 | Koike |
| 6,215,474 B1 | 4/2001 | Shah |
| 6,239,968 B1 | 5/2001 | Kim et al. |
| 6,273,252 B1 | 8/2001 | Mitchell |
| 6,274,826 B1 | 8/2001 | Serizawa et al. |
| 6,301,100 B1 | 10/2001 | Iwata |
| 6,305,656 B1 | 10/2001 | Wemyss |
| 6,313,892 B2 | 11/2001 | Gleckman |
| 6,313,982 B1 | 11/2001 | Hino |
| 6,317,313 B1 | 11/2001 | Mosgrove et al. |
| 6,349,824 B1 | 2/2002 | Yamada |
| 6,353,529 B1 | 3/2002 | Cies |
| 6,375,009 B1 | 4/2002 | Lee |
| 6,388,877 B1 | 5/2002 | Canova et al. |
| 6,396,769 B1 | 5/2002 | Polany |
| 6,415,138 B2 | 7/2002 | Sirola et al. |
| 6,445,577 B1 | 9/2002 | Madsen et al. |
| 6,456,487 B1 | 9/2002 | Hetterick |
| 6,471,056 B1 | 10/2002 | Tzeng |
| 6,519,141 B2 | 2/2003 | Tseng et al. |
| 6,525,928 B1 | 2/2003 | Madsen et al. |
| 6,532,152 B1 | 3/2003 | White et al. |
| 6,536,589 B2 | 3/2003 | Chang |
| 6,571,056 B2 | 5/2003 | Shimamura et al. |
| 6,594,472 B1 | 7/2003 | Curtis et al. |
| 6,595,608 B1 | 7/2003 | Minelli et al. |
| 6,614,423 B1 | 9/2003 | Wong et al. |
| 6,614,722 B2 | 9/2003 | Polany et al. |
| 6,616,111 B1 | 9/2003 | White |
| 6,617,973 B1 | 9/2003 | Osterman |
| 6,625,394 B2 | 9/2003 | Smith et al. |
| 6,626,362 B1 | 9/2003 | Steiner et al. |
| 6,636,697 B2 | 10/2003 | Smith et al. |
| 6,646,864 B2 | 11/2003 | Richardson |
| 6,659,274 B2 | 12/2003 | Enners |
| 6,665,174 B1 | 12/2003 | Derr et al. |
| 6,667,738 B2 | 12/2003 | Murphy |
| 6,669,017 B2 | 12/2003 | Linihan |
| 6,698,608 B2 | 3/2004 | Parker et al. |
| 6,701,159 B1 | 3/2004 | Powell |
| 6,721,651 B1 | 4/2004 | Minelli |
| 6,731,913 B2 | 5/2004 | Humphreys et al. |
| 6,751,552 B1 | 6/2004 | Minelli |
| 6,760,570 B1 | 7/2004 | Higdon |
| 6,772,899 B2 | 8/2004 | Delmon |
| 6,778,388 B1 | 8/2004 | Minelli |
| 6,781,825 B2 | 8/2004 | Shih et al. |

(56) References Cited

U.S. PATENT DOCUMENTS

| | | |
|---|---|---|
| 6,785,566 B1 | 8/2004 | Irizarry |
| 6,819,549 B1 | 11/2004 | Lammers-Meis et al. |
| 6,819,866 B2 | 11/2004 | Silva |
| 6,822,161 B2 | 11/2004 | Komatsu et al. |
| 6,822,640 B2 | 11/2004 | Derocher |
| 6,839,430 B2 | 1/2005 | Kwak |
| 6,844,845 B1 | 1/2005 | Whiteside et al. |
| 6,913,201 B1 | 7/2005 | Wagner et al. |
| 6,914,774 B1 | 7/2005 | Albertini et al. |
| 6,929,141 B1 | 8/2005 | Minghetti |
| 6,954,405 B2 | 10/2005 | Polany et al. |
| 6,955,293 B1 | 10/2005 | Katsanevas |
| 6,962,454 B1 | 11/2005 | Costello |
| 6,971,517 B2 | 12/2005 | Chen |
| 6,975,888 B2 | 12/2005 | Buesseler et al. |
| 6,980,777 B2 | 12/2005 | Shepherd et al. |
| 6,983,130 B2 | 1/2006 | Chien et al. |
| 6,987,527 B2 | 1/2006 | Kossin |
| 6,992,659 B2 | 1/2006 | Gettemy |
| 6,995,976 B2 | 2/2006 | Richardson |
| 7,025,274 B2 | 4/2006 | Solomon et al. |
| 7,046,230 B2 | 5/2006 | Zadesky et al. |
| 7,050,712 B2 | 5/2006 | Shimamura |
| 7,050,841 B1 | 5/2006 | Onda |
| 7,054,441 B2 | 5/2006 | Pletikosa |
| 7,061,762 B2 | 6/2006 | Canova, Jr. et al. |
| 7,069,063 B2 | 6/2006 | Halkosaari et al. |
| 7,072,467 B2 | 7/2006 | Ono |
| 7,082,264 B2 | 7/2006 | Watanabe et al. |
| 7,085,542 B2 | 8/2006 | Dietrich et al. |
| 7,089,547 B2 | 8/2006 | Goodman et al. |
| 7,106,959 B2 | 9/2006 | Sato |
| 7,146,701 B2 | 12/2006 | Mahoney et al. |
| 7,158,376 B2 | 1/2007 | Richardson et al. |
| 7,180,735 B2 | 2/2007 | Thomas et al. |
| 7,194,086 B2 | 3/2007 | Pletikosa |
| 7,194,202 B2 | 3/2007 | Funahashi et al. |
| 7,194,291 B2 | 3/2007 | Peng |
| 7,225,923 B2 | 6/2007 | Hallee et al. |
| 7,230,823 B2 | 6/2007 | Richardson et al. |
| 7,236,588 B2 | 6/2007 | Gartrell |
| 7,255,228 B2 | 8/2007 | Kim |
| 7,263,032 B2 | 8/2007 | Polany et al. |
| 7,290,654 B2 | 11/2007 | Hodges |
| 7,312,984 B2 | 12/2007 | Richardson et al. |
| 7,327,841 B2 | 2/2008 | Schreiber et al. |
| 7,341,144 B2 | 3/2008 | Tajiri et al. |
| 7,343,184 B2 | 3/2008 | Rostami |
| 7,352,961 B2 | 4/2008 | Watanabe et al. |
| 7,362,570 B2 | 4/2008 | Su |
| 7,365,281 B2 | 4/2008 | Yamaguchi et al. |
| 7,366,555 B2 | 4/2008 | Jokinen et al. |
| 7,369,881 B2 | 5/2008 | Tsujimoto |
| 7,400,917 B2 | 7/2008 | Wood et al. |
| 7,409,148 B2 | 8/2008 | Takahashi et al. |
| 7,418,278 B2 | 8/2008 | Eriksson et al. |
| 7,428,427 B2 | 9/2008 | Brunstrom et al. |
| 7,436,653 B2 | 10/2008 | Yang et al. |
| 7,449,650 B2 | 11/2008 | Richardson et al. |
| 7,464,813 B2 | 12/2008 | Carnevali |
| 7,464,814 B2 | 12/2008 | Carnevali |
| 7,495,659 B2 | 2/2009 | Marriott et al. |
| 7,495,895 B2 | 2/2009 | Carnevali |
| 7,499,040 B2 | 3/2009 | Zadesky et al. |
| 7,502,550 B2 | 3/2009 | Ariga |
| 7,511,956 B2 | 3/2009 | Tomioka et al. |
| 7,525,792 B2 | 4/2009 | Yokote |
| 7,535,799 B2 | 5/2009 | Polany et al. |
| 7,540,844 B2 | 6/2009 | Muser |
| 7,555,325 B2 | 6/2009 | Goros |
| 7,558,594 B2 | 7/2009 | Wilson |
| 7,594,576 B2 | 9/2009 | Chen et al. |
| 7,609,512 B2 | 10/2009 | Richardson et al. |
| 7,613,386 B2 | 11/2009 | Shimamura |
| 7,623,898 B2 | 11/2009 | Holmberg |
| 7,630,746 B2 | 12/2009 | Holmberg |
| 7,653,292 B2 | 1/2010 | Yamaguchi et al. |
| 7,663,878 B2 | 2/2010 | Swan et al. |
| 7,663,879 B2 | 2/2010 | Richardson et al. |
| 7,668,580 B2 | 2/2010 | Shin et al. |
| 7,679,674 B2 | 3/2010 | Nishizawa |
| 7,688,580 B2 | 3/2010 | Richardson et al. |
| 7,697,269 B2 | 4/2010 | Yang et al. |
| 7,711,400 B2 | 5/2010 | Nuovo |
| 7,733,642 B2 | 6/2010 | Liou et al. |
| 7,755,975 B2 | 7/2010 | Pettersen et al. |
| 7,772,507 B2 | 8/2010 | Orr et al. |
| 7,775,354 B2 | 8/2010 | Latchford et al. |
| 7,787,756 B2 | 8/2010 | Funahashi et al. |
| 7,789,228 B2 | 9/2010 | Zenzai |
| 7,789,696 B2 | 9/2010 | Umei et al. |
| 7,801,425 B2 | 9/2010 | Fantone et al. |
| 7,854,434 B2 | 12/2010 | Heiman et al. |
| 7,889,489 B2 | 2/2011 | Richardson et al. |
| 7,907,394 B2 | 3/2011 | Richardson et al. |
| 7,926,818 B2 | 4/2011 | Isono |
| 7,933,122 B2 | 4/2011 | Richardson et al. |
| 7,936,566 B2 | 5/2011 | Shigyo et al. |
| 7,941,196 B2 | 5/2011 | Kawasaki et al. |
| 7,944,697 B2 | 5/2011 | Hata et al. |
| 7,978,092 B2 | 7/2011 | Osaka |
| 7,988,468 B2 | 8/2011 | Yang et al. |
| 8,004,835 B2 | 8/2011 | Conti et al. |
| 8,014,134 B2 | 9/2011 | Liu et al. |
| 8,024,015 B2 | 9/2011 | Araki et al. |
| 8,031,472 B2 | 10/2011 | Bicket et al. |
| 8,032,194 B2 | 10/2011 | Liu et al. |
| 8,050,022 B2 | 11/2011 | Mcintyre |
| 8,053,668 B2 | 11/2011 | Lai et al. |
| 8,068,331 B2 | 11/2011 | Sauers et al. |
| 8,089,757 B2 | 1/2012 | Chen et al. |
| 8,101,859 B2 | 1/2012 | Zadesky |
| 8,138,434 B2 | 3/2012 | Tang et al. |
| 8,204,561 B2 | 6/2012 | Mongan et al. |
| 8,223,997 B2 | 7/2012 | Ron et al. |
| 8,265,264 B2 | 9/2012 | Yamaguchi et al. |
| 8,295,043 B2 | 10/2012 | Tai et al. |
| 2001/0040109 A1 | 11/2001 | Yaski et al. |
| 2002/0009195 A1 | 1/2002 | Schon |
| 2002/0065054 A1 | 5/2002 | Humphreys et al. |
| 2002/0071550 A1 | 6/2002 | Pletikosa |
| 2002/0079244 A1 | 6/2002 | Kwong |
| 2002/0085342 A1 | 7/2002 | Chen et al. |
| 2002/0085709 A1 | 7/2002 | Hsu |
| 2002/0086702 A1 | 7/2002 | Lai et al. |
| 2002/0090212 A1 | 7/2002 | Shimamura et al. |
| 2002/0101707 A1 | 8/2002 | Canova et al. |
| 2002/0136557 A1 | 9/2002 | Shimamura |
| 2002/0137475 A1 | 9/2002 | Shou et al. |
| 2002/0175096 A1 | 11/2002 | Linihan |
| 2002/0195910 A1 | 12/2002 | Hus et al. |
| 2003/0080947 A1 | 5/2003 | Genest et al. |
| 2003/0095374 A1 | 5/2003 | Richardson |
| 2003/0103624 A1 | 6/2003 | Hu |
| 2003/0111366 A1 | 6/2003 | Enners |
| 2003/0114184 A1 | 6/2003 | Wilson |
| 2003/0128397 A1 | 7/2003 | Smith et al. |
| 2003/0151890 A1 | 8/2003 | Huang et al. |
| 2004/0014506 A1 | 1/2004 | Kemppinen |
| 2004/0120219 A1 | 6/2004 | Polany et al. |
| 2004/0121226 A1 | 6/2004 | Kaelin et al. |
| 2004/0180706 A1 | 9/2004 | Pan |
| 2004/0195783 A1 | 10/2004 | Akagi et al. |
| 2004/0198247 A1* | 10/2004 | Jokinen ............... H04M 1/0283 455/90.1 |
| 2004/0203486 A1* | 10/2004 | Shepherd ............ H04B 1/3888 455/90.1 |
| 2004/0226836 A1 | 11/2004 | Schreiber et al. |
| 2004/0262179 A1 | 12/2004 | Gartrell et al. |
| 2005/0139498 A1 | 6/2005 | Goros |
| 2005/0247584 A1 | 11/2005 | Lu |
| 2005/0279661 A1 | 12/2005 | Hodges |
| 2006/0177048 A1 | 8/2006 | Tsutaichi et al. |
| 2006/0274493 A1 | 12/2006 | Richardson et al. |

(56) References Cited

U.S. PATENT DOCUMENTS

| | | |
|---|---|---|
| 2006/0279924 A1 | 12/2006 | Richardson et al. |
| 2007/0071423 A1 | 3/2007 | Fantone et al. |
| 2007/0115387 A1 | 5/2007 | Ho |
| 2007/0138920 A1 | 6/2007 | Austin et al. |
| 2007/0158220 A1 | 7/2007 | Cleereman et al. |
| 2007/0205122 A1 | 9/2007 | Oda et al. |
| 2007/0215663 A1 | 9/2007 | Chongson et al. |
| 2007/0280053 A1 | 12/2007 | Polany et al. |
| 2008/0039161 A1 | 2/2008 | Chan |
| 2008/0055258 A1 | 3/2008 | Sauers |
| 2008/0125197 A1 | 5/2008 | Hongo et al. |
| 2008/0157485 A1 | 7/2008 | Isono |
| 2008/0163463 A1 | 7/2008 | Hulden |
| 2008/0164267 A1 | 7/2008 | Huber |
| 2008/0316687 A1 | 12/2008 | Richardson et al. |
| 2009/0009945 A1 | 1/2009 | Johnson et al. |
| 2009/0017884 A1 | 1/2009 | Rotschild |
| 2009/0034169 A1 | 2/2009 | Richardson et al. |
| 2009/0080153 A1 | 3/2009 | Richardson et al. |
| 2009/0087655 A1 | 4/2009 | Yamada et al. |
| 2009/0111543 A1 | 4/2009 | Tai et al. |
| 2009/0113758 A1 | 5/2009 | Nishiwaki et al. |
| 2009/0260844 A1 | 10/2009 | Tseng |
| 2010/0053355 A1 | 3/2010 | Iwase et al. |
| 2010/0085691 A1 | 4/2010 | Yeh et al. |
| 2010/0093412 A1 | 4/2010 | Serra et al. |
| 2010/0096284 A1 | 4/2010 | Bau |
| 2011/0073608 A1 | 3/2011 | Richardson et al. |
| 2011/0157800 A1 | 6/2011 | Richardson et al. |

FOREIGN PATENT DOCUMENTS

| | | |
|---|---|---|
| WO | 1999041958 A1 | 8/1999 |
| WO | 2007122722 A | 11/2007 |

\* cited by examiner

Fig. 7

PROTECTIVE CUSHION COVER FOR AN ELECTRONIC DEVICE

CROSS-REFERENCE TO RELATED APPLICATIONS

This application claims priority to U.S. Provisional Patent Application No. 61/141,097, filed Dec. 29, 2008, and U.S. patent application Ser. No. 12/648,549 filed Dec. 29, 2009, each of which is hereby incorporated by reference in its entirety.

BACKGROUND

Numerous different types of electronic devices currently exist for communication, entertainment purposes, and other purposes. These include various types of computers, including laptop computers, hand-held computers, ultra-mobile computers and tablet computers. In addition, other types of electronic devices include MP3 players that play music, video players, smartphones and other types of communication devices, such as walkie-talkies, and navigation devices, such as GPS devices. These devices often include touch screens, interactive panels including, but not limited to, capacitive coupled interfaces, keyboards, scroll wheels, tilt switches, push button switches and other interactive controls. Due to the sensitive nature of these electronic devices, it is desirable to provide protection for these devices.

SUMMARY

A protective cover for an electronic device can include reduced thickness portions formed from an elastomeric material having a predetermined density and a first predetermined thickness that provides ease of use of the electronic device, raised impact portions having a second predetermined thickness that is greater than the first predetermined thickness, the raised impact portions formed from the elastomeric material, ribs disposed between recesses formed in the raised impact portions, the recesses having a size and spacing that absorbs shocks from impacts.

A method of protecting an electronic device from impacts can include providing a protective cover formed from an elastomeric material that has a predetermined density; providing reduced thickness portions of the protective cover that have a first predetermined thickness; providing raised impact portions of the protective cover that have a second predetermined thickness that is greater than the first predetermined thickness; providing recesses in the raised impact portions of the protective cover that allow the protective cover to compress and absorb impacts at the raised impact portions.

A protective cover for a handheld electronic device can include an electronic material having a substantially uniform predetermined thickness and a predetermined density that allows the elastomeric material to substantially conform and surround at least a back portion, end portions and side portions of the electronic device; ribs and recesses formed in the elastomeric material that have a size and spacing that substantially absorbs shocks from impact to the protective cover.

A method of protecting a handheld electronic device can include providing a protective cushion cover having a predetermined density, a predetermined modulus of elasticity, and a predetermined thickness that allow the cushion cover to tightly conform to the handheld electronic device and provide a slim profile for ease of use of the handheld electronic device, forming ribs and recesses in the protective cushion cover that have a size and spacing that substantially absorb impact energy in a manner that is equivalent to thicker, less dense protective cushion covers.

DETAILED DESCRIPTION

Figure 1:
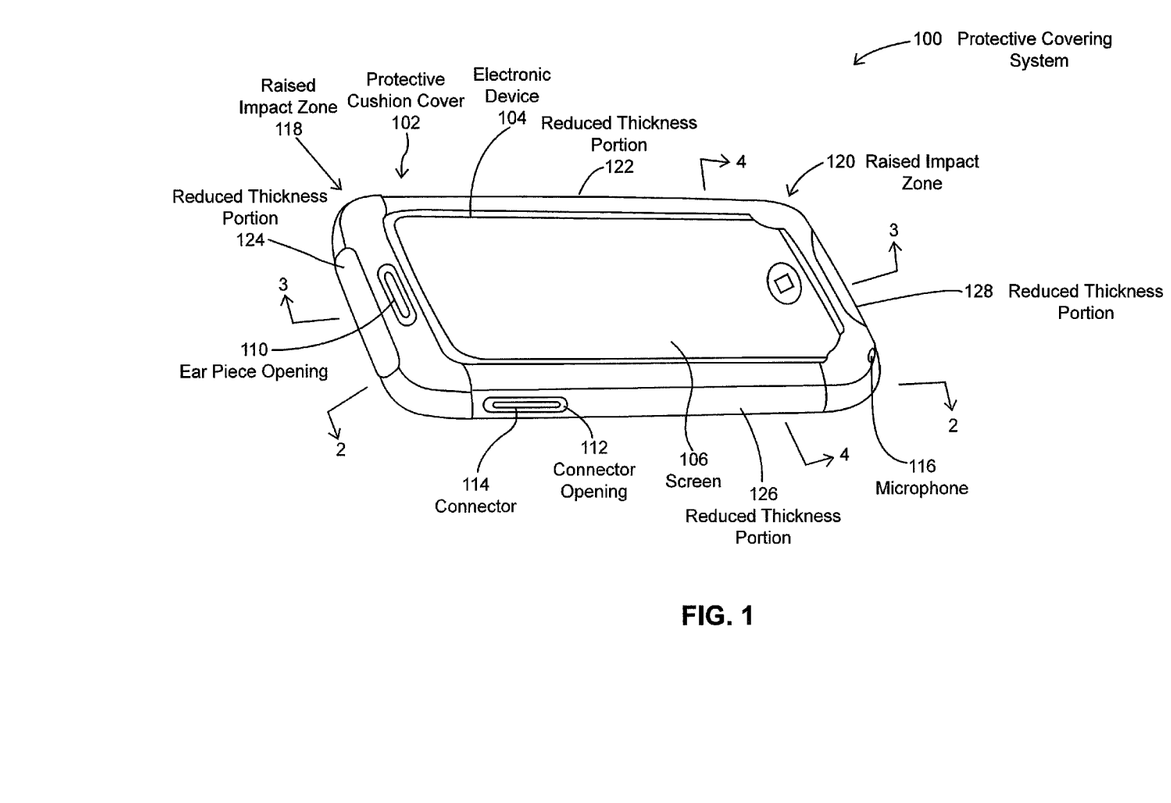
FIG. 1 is a schematic perspective view of an embodiment of a protective covering system for an electronic device.

FIG. 1 is a schematic perspective view of one embodiment of a protective covering system 100 that utilizes a protective cushion cover 102 to provide protection to an electronic device 104. The electronic device 104 can be any type of an electronic device including various types of MP3 players, video players, cell phones, smartphones, satellite phones, walkie-talkies, GPS navigational devices, telematics devices, pagers, monitors, personal data assistants, bar code scanners, as well as various types of computers including portable computers, laptop computers, handheld computers, ultra-mobile computers, tablet computers and various hybrid devices that combine two or more of these functions. In addition, these devices may operate with only a touch screen interface or only a keyboard and display or other type of manual input, and are not limited to devices that include keyboards or buttons as well as a touch screen.

The protective cushion cover 102, illustrated in FIG. 1, wraps around a portion of the outer surface of the electronic device 104. An opening in the protective cushion cover 102 allows the screen 106 of the electronic device 104 to display information. The opening also allows a user to input information into the electronic device 104, if the screen 106 is a touchscreen, or through a keypad that is accessible through the opening. The underside of the protective cushion cover 102 substantially covers the back of the electronic device 104. The protective cushion cover 102 additionally has an earpiece opening 110 that provides access to a speaker or earpiece on the electronic device 104, and a connector opening 112, to access a connector 114. The front opening in the protective cushion cover 102 also allows easy access to microphone 116. The protective cushion cover 102 has raised impact zones 118, 120. These raised impact zones 118, 120 provide additional thickness and cushioning to protect the electronic device 104 when electronic device 104 is dropped. As disclosed below, a slim profile for the protective covering system 100 is desirable to allow ease of use of the electronic device 104. In that regard, portions of the protective cushion cover 102 have reduced thickness portions 122, 124, 126, 128 that would not normally contact a surface when dropped, and thicker, raised impact portions 118, 120 around the electronic device 104 that otherwise would contact a surface when dropped. For example, the back portion of the protective cushion cover, as illustrated in FIG. 1, also has a thicker portion which provides adequate protection for the electronic device 104.

The protective cover 102 fits snuggly over the electronic device 104 and is held in place on the electronic device 104 as a result of the pre-shaping of the protective cover 102. The protective cover 102 is made from a soft, pliable material, such as an elastomeric material, that is capable of stretching sufficiently to allow the electronic device 104 to slide easily into and be removed from the protective cover 102. The protective cover 102 has a modulus of elasticity that allows the protective cover 102 to conform closely to the electronic device 104.

In order to achieve the results of providing a protective covering that is thin and conforms well to the electronic device, while having thicker, softer portions in impact areas, such as corners, it would appear that two different types of material would be required. The use of two different types of materials, that are joined together in a layered fashion, would substantially increase the cost of a protective cover because of the increased manufacturing costs resulting from the complexity of the manufacturing processes for forming protective covers that are made from more than one material, in addition to the added cost of using two different materials.

Figure 2:
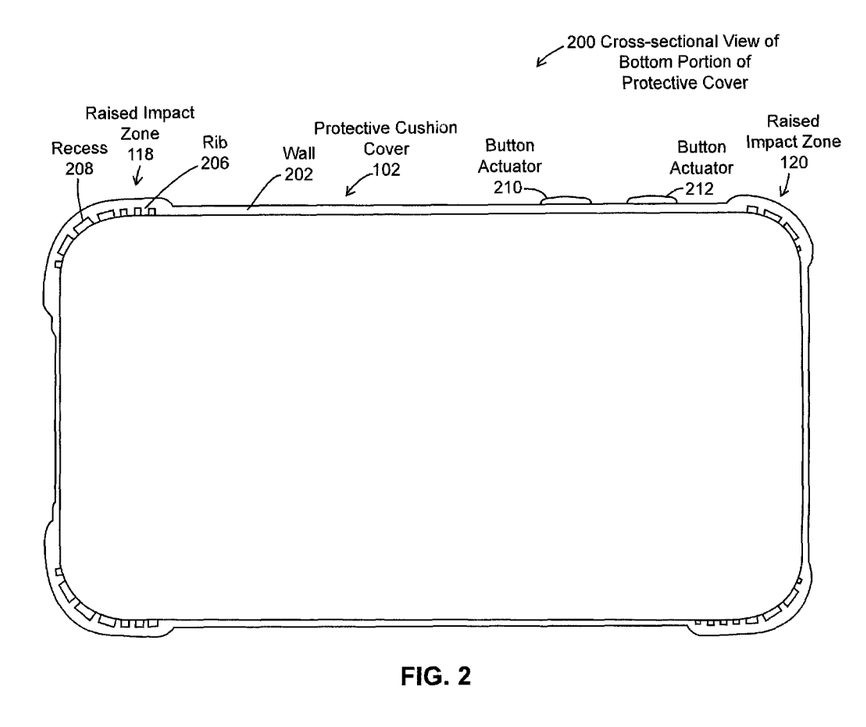
FIG. 2 is a cross-sectional view showing the bottom portion of the embodiment illustrated in FIG. 1.

Alternatively, the embodiments disclosed herein provide the cushioning that would otherwise be provided by a softer, thicker material, while utilizing a single, denser material. FIG. 2 is a cross-sectional view 200 of the bottom portion of the protective cover 102 that is illustrated in FIG. 1. As shown in FIG. 2, the protective cover 102 has a thin wall portion 202 and enlarged corner portions, such as raised impact zone 118. The protective cover 102 is made from a material that has a density and modulus of elasticity that allows the protective cover to conform well to the electronic device 104 (FIG. 1), while also providing thicker, raised portions in impact areas, such as the corners, that simultaneously prevent an impact with a hard surface from being transmitted directly to the electronic device 104, as a result of the cover being compressed in the impact area, as well as being sufficiently soft to absorb and prevent the transfer of energy through the protective cover 102 to the electronic device. In this manner, denser materials can provide protection that is equivalent to the protection provided by thicker, less dense materials to protect against the transfer of an impact directly to the electronic device resulting from compression of the protective cover material. However, thinner, denser materials are more advantageous for a protective cover, since they provide a slimmer profile than thicker, less dense materials that provide equivalent impact protection. However, denser materials more efficiently transfer energy from impacts than softer, less dense materials. In that regard, it would be advantageous to provide a cover that has the advantages of providing a slimmer profile and preventing impacts from being transferred to an enclosed electronic device as a result of compression of the cover, while simultaneously providing the advantages of absorbing impact energy, so that impact energy is not transferred to the electronic device.

The protective cover 102, illustrated in FIG. 1, is stretchable and can be made of a variety of thermoplastic materials, such as synthetic rubber, silicone, urethane or other materials that are capable of stretching sufficiently to allow the electronic device 104 to slide into the front opening of the protective cover 102. The modulus of elasticity of the protective cover is sufficient to allow the protective cover to easily conform to the electronic device 102 and allow the electronic device 102 to snuggly fit within the protective cover 102.

The raised impact zone 118, illustrated in FIG. 2, includes a plurality of recesses, such as recess 208. Between each adjacent recess is a rib 206. Hence, a plurality of recesses and ribs are provided in the raised impact zones 118, 120. The wall 202 and raised impact zones 118, 120 of the protective cover 102 are made from the same elastomeric material. The recesses form the ribs which provide a softer, more flexible area in the corner portions and other impact zones that are capable of absorbing impact shocks. Of course, any portion of the protective cushion cover 102 that needs impact protection can utilize raised impact zones, and the raised impact zones are not limited to being disposed on end or corner portions only. For example, the back and sides of the cover can have raised impact zones, as desired. The ribs provide support for the enlarged corner portions, such as raised impact zones 118, 120, while the recesses and ribs allow the raised impact zones 118, 120 to compact and absorb energy from impacts. In this fashion, the enlarged corner portions, such as raised impact zones 118, 120, are softer, even though the material used for the enlarged corner portions is the same denser material that is used for the wall 202. The recesses, such as recess 208, allow compression of the ribs, such as rib 206, into the recess portions, so as to absorb shock and energy from impacts in the impact zones 118, 120. The size of the ribs, with respect to the size of the recesses, can be varied to vary the amount of compression that occurs so that shocks occurring in drop situations are absorbed. Button actuators 210, 212 are formed in the protective cushion cover 102 that allow a user to transfer force to control buttons on the electronic device 104. The denser material, that is thinner in the wall portion 202, allows for better functionality insofar as controlling the buttons on the electronic device, using the button actuators 210, 212.

Figure 3:
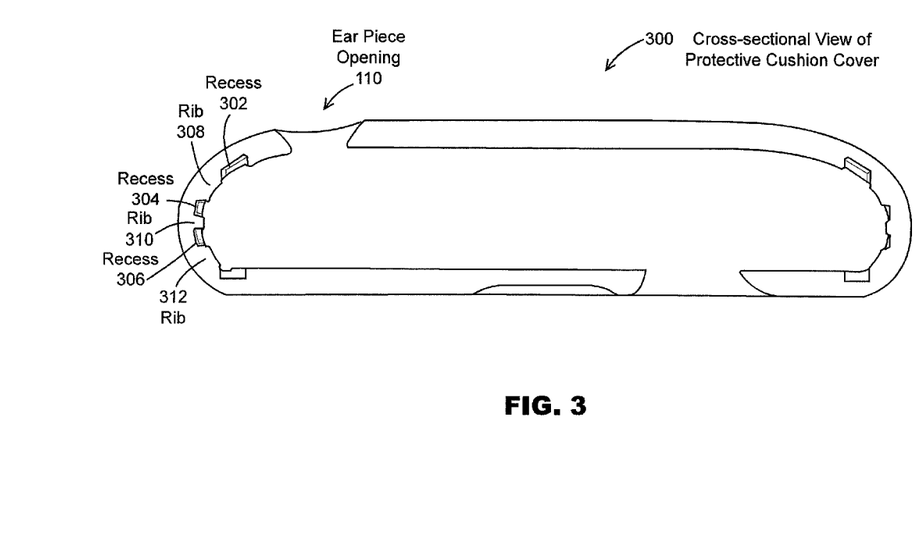
FIG. 3 is a cross-sectional view of the side of the protective cushion cover that is illustrated in FIG. 1.

FIG. 3 is a cross-sectional side view 300 of the protective cushion cover 102. As shown in FIG. 3, a plurality of recesses 302, 304, 306 are formed in one end of the protective cushion cover 102. Ribs 308, 310, 312 are disposed between the recesses. Again, the size and spacing of the recesses 302-306 determine the size and spacing of the ribs 308-312. Formation of the recesses 302-306 softens the impact zones of the protective cushion cover 102 so that the impact zones, that are more likely to impact a hard surface, are softer and absorb impacts with hard surfaces. In this manner, the shock and energy of an impact is absorbed more readily by the protective cushion cover 102. However, the recesses are not made large enough that the protective cover 102 compresses in the area of the impact and causes the impact to be transferred directly to the enclosed electronic device 104. Stated differently, the recesses are sufficiently small to ensure that the impact zones do not compress sufficiently to directly transfer impacts, under standard conditions, such as drop situations, to the electronic device. FIG. 3 also illustrates ear piece opening 110.

Figure 4:
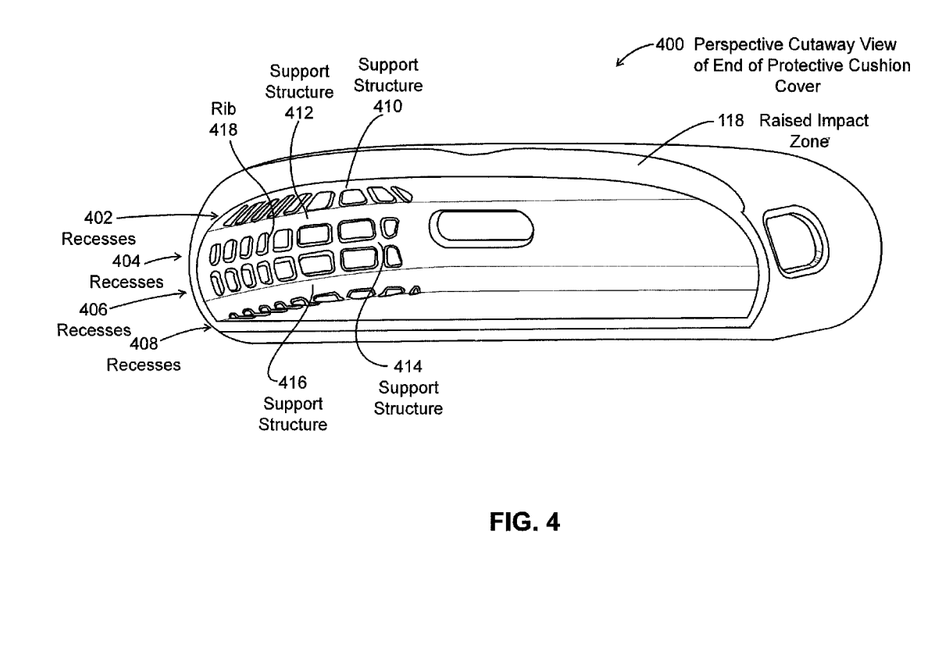
FIG. 4 is a perspective cross-sectional view of an end of the protective cushion cover.

FIG. 4 is a perspective cross-sectional view 400 of an end portion of the protective cushion cover 102. As shown in FIG. 4, there are a plurality of rows of recesses 402, 404, 406, 408 that are formed in the end portion. Support structures 410, 412, 414, 416 are disposed between and adjacent to the rows of recesses 402-408. Ribs, such as rib 418, are disposed between each of the recesses. Recesses 402 is formed in the enlarged end portion 118 along a curved portion that meets with a thinner sidewall. The recesses, for example, may be approximately 5 mm by 4 mm by 1 mm (width, length, height) to 3 mm by 1 mm by 0.5 mm (width, length, height) and may be spaced apart to form ribs that are approximately 1.0 mm to 0.5 mm thickness in one embodiment. For instance, the ribs can have a thickness of approximately 0.7 mm. Other sizes can be used depending upon the density of the material and the cushioning desired. For example, in one embodiment, square recesses are utilized that are approximately 1.5 mm square and have a depth of approximately 1.25 mm. In another embodiment, the recesses can have a width, length, and height of approximately 4 mm, 2 mm, and 0.7 mm, respectively. Recesses 408 are also disposed in a corner where a sidewall meets a bottom portion of the protective cushion cover 102. In one embodiment, the thickness of the protective cover 102 in the raised end portions 118, 120 is approximately 2 mm to 3 mm. The thickness of the protective cover 102 in the reduced thickness portions is approximately 0.5 mm to 0.7 mm, including, for example, 0.6 mm. These are examples only and any desired thickness can be used to provide the desired slim profile while maintaining sufficient protection against impacts by providing ribs and recesses that are capable of absorbing impacts to the protective case under normal use conditions. The density of the elastomeric material is approximately 50-60 Shore A hardness, but may vary from 30 to 70 Shore A hardness. In one embodiment, a range of 48-52 Shore A is used. The recesses 402-408 assist in absorbing impacts along the curved corners of the protective cushion cover 102. All of the recesses 402-408 are disposed in the corner portions and the end portions of the protective cushion cover 102 where impacts are more likely to occur, but can be included in other areas, such as the back.

Hence, the protective cushion cover 102 is capable of providing an additional ability to absorb shocks in areas that are more likely to be impacted by increasing the thickness of the protective cover and providing recesses and ribs between the recesses that soften that area and better absorb impacts. This allows a single material to be used that has a higher density and better conformability to an enclosed electronic device. Thinner walls can be employed in a higher density cover which increases the usability of the protective covering system.

Figure 5:
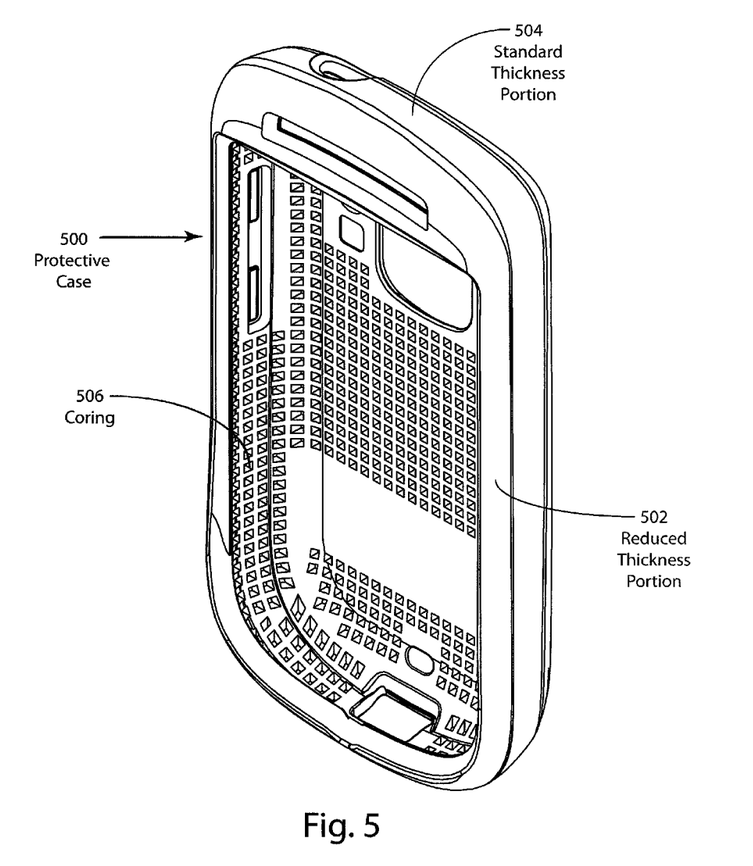
FIG. 5 is a schematic isometric view of another embodiment of a protective cushion cover.

FIG. 5 is a schematic isometric view of another embodiment of a protective cover 500. As shown in FIG. 5, protective cover 500 has a reduced thickness portion 502 and a standard thickness portion 504. The reduced thickness portion 502 is along the upper edge adjacent the opening in the protective cover 500, which allows easy access to the electronic device that is disposed in the protective cover 500. For example, the reduced thickness portion 502 allows the fingers of the user to easily access the electronic device for texting and entering data, such as telephone numbers and other data, into the electronic device. The standard thickness portion 504 extends along the sides and back of the protective cover 500. Coring 506 is disposed in the standard thickness portion 504 and effectively softens and reduces the average density of the standard thickness portion 504, as a result of the ribs and recessed portions that form the coring 506. Coring 506, in one embodiment, is approximately 1.5 mm square and has a depth of approximately 1.25 mm.

Figure 6:
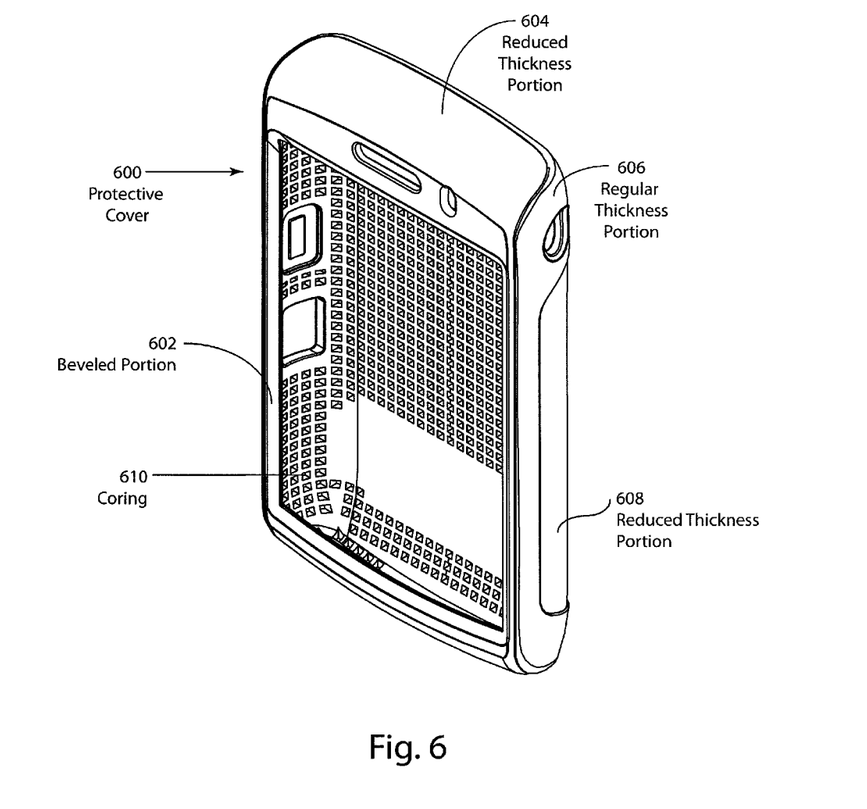
FIG. 6 is a schematic isometric diagram of another embodiment of a protective cushion cover.

FIG. 6 is a schematic isometric diagram of another embodiment of a protective cover 600. As shown in FIG. 6, a beveled portion 602 is adjacent the opening, to allow easy access to the electronic device. A reduced thickness portion 604 and reduced thickness portion 608 are thinner than the regular thickness portion 606. For example, the reduced thickness portion may be approximately 0.5 mm to 0.7 mm, while the regular thickness portion 606 may be approximately 1.5 mm to 2.0 mm. Coring 610 is disposed along various surfaces of the regular thickness portion 606 to provide an average density and softness that is less than the average density and softness of the elastomeric material that forms the protective cover 600.

Figure 7:
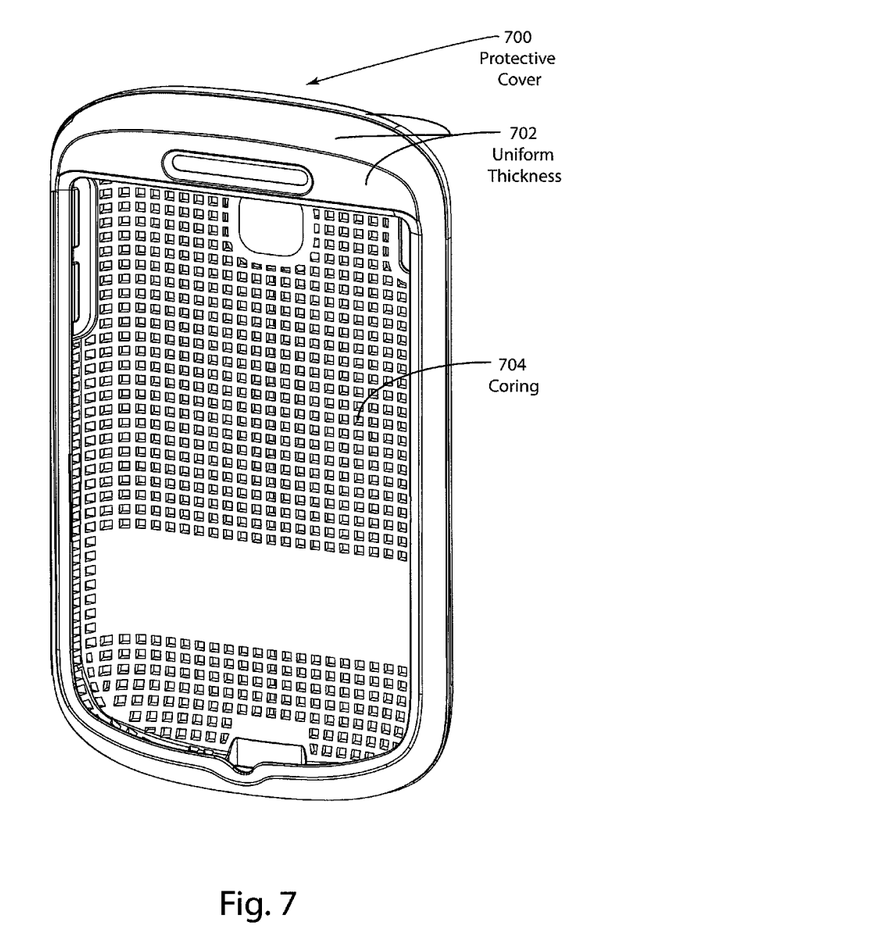
FIG. 7 is a schematic isometric diagram of another embodiment of a protective cushion cover.

FIG. 7 illustrates an embodiment of a protective cover 700. As shown in FIG. 7, the protective cover 700 has a substantially uniform thickness 702 across all of the different portions of the protective cover 700. Coring 704 is disposed along side portions and back portions of the protective cover 700 and functions, as disclosed above, to absorb shocks from impacts and provide an average density that is less than the density of the protective cover 700, which allows the protective cover 700 to be softer in the areas in which the coring 704 exists. The softer portions of the protective cover 700 can more readily absorb shocks from impact than areas without the coring 704. The coring can include a plurality of recesses. For example, the coring (e.g. 506, 610, 704) can include at least 200 recesses or at least 400 recesses, as shown in FIGS. 5-7.

The foregoing description has been presented for purposes of illustration and description. It is not intended to be exhaustive or to limit the embodiments to the precise forms disclosed, and other modifications and variations may be possible in light of the above teachings. The embodiments were chosen and described in order to best explain the principles of the embodiments and their practical applications to thereby enable others skilled in the art to best utilize the embodiments and various modifications of the embodiments as suited to the particular use contemplated. It is intended that the appended claims be construed to include other alternative embodiments except insofar as limited by the prior art.

What is claimed is:

1. A protective case for an electronic device, the protective case comprising:
    an elastomeric cover comprising a single piece of elastomeric material that conforms to the electronic device and forms a continuous perimeter extending around and contacting four sides of the electronic device when the electronic device is installed in the protective case, the elastomeric cover including:
        a back portion that is adjacent to a back of the electronic device when the electronic device is installed in the protective case;
        a plurality of side portions attached to the back portion, each side portion adjacent to a respective side of the four sides of the electronic device when the electronic device is installed in the protective case;
        a button actuator integrally formed in the elastomeric cover to transfer a force applied on an outside surface of the elastomeric cover to a control button of the electronic device inside the elastomeric cover;
        a front opening in the elastomeric cover that provides access to a touch screen interface of a front of the electronic device when the electronic device is installed in the protective case;
        a raised impact area having a thickness that is greater than a thickness of one or more other areas of the elastomeric cover; and
        a plurality of recesses formed in the raised impact area of the elastomeric cover, wherein the plurality of recesses soften the elastomeric cover in the selected area by reducing an average density of the elastomeric cover in the selected area of the elastomeric cover.

2. The protective case of claim 1 wherein the elastomeric cover further includes a connector opening formed in the elastomeric cover for accessing an electrical connector of the electronic device when the electronic device is in the elastomeric cover.

3. The protective case of claim 1 wherein the elastomeric cover further includes a speaker opening in the elastomeric cover that aligns with a speaker of the electronic device when the electronic device is in the elastomeric cover.

4. The protective case of claim 1 wherein the elastomeric cover further includes a second button actuator formed in the elastomeric cover to transfer a second force applied on the outside surface of the elastomeric cover to a second control button of the electronic device inside the elastomeric cover.

5. The protective case of claim 1 wherein the electronic device is a smartphone.

6. The protective case of claim 1 wherein two or more of the plurality of recesses are separated by one or more ribs formed in the raised impact area of the elastomeric cover.

7. The protective case of claim 1 wherein the elastomeric cover further includes a beveled portion adjacent to the front opening.

8. The protective case of claim 1 wherein the elastomeric cover comprises an elastomeric material having a hardness between 30 and 70 Shore A.

9. The protective case of claim 8 wherein the elastomeric material comprises silicone, synthetic rubber, or urethane.

10. A protective case for an electronic device, the protective case comprising:
an elastomeric cover comprising a single piece of elastomeric material that conforms to the electronic device and forms a continuous perimeter extending around four sides of the electronic device when the electronic device is installed in the protective case, the elastomeric cover including:
a back portion that is adjacent to a back of the electronic device when the electronic device is installed in the protective case;
a plurality of side portions attached to the back portion, each side portion adjacent to a respective side of the four sides of the electronic device when the electronic device is installed in the protective case;
a connector opening formed in the elastomeric cover for accessing an electrical interface of the electronic device inside the elastomeric cover;
a front opening in the elastomeric cover that provides access to a touch screen interface of a front of the electronic device when the electronic device is installed in the protective case;
a button actuator integrally formed in the elastomeric cover to transfer a force applied on an outside surface of the elastomeric cover to a control button of the electronic device when the electronic device is inside the elastomeric cover;
a raised impact area having a thickness that is greater than a thickness of one or more other areas of the elastomeric cover; and
a plurality of recesses formed in the raised impact area of the elastomeric cover, wherein the plurality of recesses soften the elastomeric cover in the selected area by reducing an average density of the elastomeric cover in the selected area of the elastomeric cover.

11. The protective case of claim 10 wherein the elastomeric cover further includes a speaker opening in the elastomeric cover that aligns with a speaker of the electronic device when the electronic device is in the elastomeric cover.

12. The protective case of claim 10 wherein the electronic device is a smartphone.

13. The protective case of claim 10 wherein the electronic device is a tablet computer.

14. The protective case of claim 10 wherein two or more of the plurality of recesses are separated by one or more ribs formed in the raised impact area of the elastomeric cover.

15. The protective case of claim 10 wherein the elastomeric cover further includes a beveled portion proximate the front opening.

16. A protective shell for an electronic device, the protective shell comprising:
an elastomeric cover that wraps around at least a portion of an outer surface of the electronic device and forms a continuous perimeter extending around four or more sides of the electronic device when the electronic device is installed in the protective shell, the elastomeric cover comprising a single piece of an elastomeric material, the elastomeric cover including:
a back portion and a plurality of side portions that are adjacent to the electronic device when the electronic device is installed in the protective shell;
a first aperture in the elastomeric cover that provides access to a touch screen interface of a front portion of the electronic device when the electronic device is installed in the protective shell;
a plurality of button actuators integrally formed in the elastomeric cover, each button actuator configured to transfer a force applied by a user on an outside surface of the elastomeric cover to a respective control button of the electronic device; and
one or more raised impact areas having a thickness that is greater than a thickness of one or more other portions of the elastomeric cover, each raised impact area having a plurality of recesses, the plurality of recesses reducing an average density of the elastomeric material in the one or more raised impact areas and softening the elastomeric cover in the one or more raised impact areas.

17. The protective shell of claim 16 wherein the elastomeric cover further includes a second aperture for accessing a connector of the electronic device when the electronic device is in the elastomeric cover.

18. The protective shell of claim 16 wherein the elastomeric cover further includes a third aperture that aligns with a speaker of the electronic device when the electronic device is in the elastomeric cover.

19. The protective shell of claim 16 wherein two or more of the plurality of recesses are separated by a rib formed in one of the raised impact areas of the elastomeric cover.

20. The protective shell of claim 16 wherein the elastomeric cover further includes a beveled perimeter around the first aperture.

21. The protective shell of claim 16 wherein the elastomeric material has a hardness between 30 and 70 Shore A.

22. The protective shell of claim 16 wherein the elastomeric material comprises silicone.

23. A protective shell for a mobile computing device, the protective shell comprising:
an elastomeric cover that wraps around at least a portion of an outer surface of the mobile computing device and forms a continuous perimeter extending around at least four sides of the electronic device when the mobile computing device is installed in the protective shell, the elastomeric cover comprising a single piece of an elastomeric material, the elastomeric cover including:

a back portion and a plurality of side portions that are adjacent to the mobile computing device when the mobile computing device is installed in the protective shell;

a front opening in the elastomeric cover that provides access to a touch screen interface of a front portion of the mobile computing device when the mobile computing device is installed in the protective shell;

a button actuator integrally formed in the elastomeric cover to transfer a force applied on an outside surface of the elastomeric cover to a control button of the mobile computing device when the mobile computing device is inside the elastomeric cover;

a speaker opening in the elastomeric cover that aligns with a speaker of the mobile computing device when the mobile computing device is installed in the protective shell; and one or more raised impact areas having a thickness that is greater than a thickness of one or more other portions of the elastomeric cover, each raised impact area having a plurality of recesses, the plurality of recesses reducing an average density of the elastomeric material in the one or more raised impact areas and softening the elastomeric cover in the one or more raised impact areas.

24. The protective shell of claim 23 wherein the elastomeric cover further includes a connector opening formed in the elastomeric cover for accessing an electrical connector of the mobile device when the mobile computing device is in the elastomeric cover.

25. The protective shell of claim 23 wherein two or more of the plurality of recesses are separated by one or more ribs formed in one of the raised impact areas of the elastomeric cover.

26. The protective shell of claim 23 wherein the elastomeric cover further includes a beveled portion adjacent to the front opening in the elastomeric cover.

27. The protective case of claim 1, wherein the raised impact area has a thickness of approximately 2 mm to 3 mm.

28. The protective case of claim 1, wherein the plurality of recesses are positioned on at least two adjacent side portions of the plurality of side portions of the elastomeric cover.

29. The protective case of claim 1, wherein the raised impact area comprises a corner formed from two of the plurality of side portions of the elastomeric cover.

30. The protective case of claim 6, wherein the one or more ribs are positioned on an interior surface of the elastomeric cover, the interior surface facing the electronic device when the electronic device is installed in the protective case.

31. The protective case of claim 30, wherein each of the one or more ribs extend from an interior upper surface adjacent to the front of the installed electronic device to the back portion.

32. The protective case of claim 31, wherein each of the one or more ribs are formed proximate a corner formed from two of the plurality of side portions of the elastomeric cover.

* * * * *